United States Patent
Swamy

(10) Patent No.: US 12,477,216 B2
(45) Date of Patent: Nov. 18, 2025

(54) CONTEXTUALLY-AWARE POWER REDUCTION TECHNIQUES

(71) Applicant: CISCO TECHNOLOGY, INC., San Jose, CA (US)

(72) Inventor: Ramkrishna Swamy, Morgan Hill, CA (US)

(73) Assignee: Cisco Technology, Inc., San Jose, CA (US)

(*) Notice: Subject to any disclaimer, the term of this patent is extended or adjusted under 35 U.S.C. 154(b) by 510 days.

(21) Appl. No.: 17/935,641

(22) Filed: Sep. 27, 2022

(65) Prior Publication Data

US 2024/0107153 A1     Mar. 28, 2024

(51) Int. Cl.
*H04N 23/65*     (2023.01)
*G06V 20/40*     (2022.01)
*H04N 23/61*     (2023.01)

(52) U.S. Cl.
CPC ........... *H04N 23/651* (2023.01); *H04N 23/61* (2023.01); *G06V 20/41* (2022.01)

(58) Field of Classification Search
CPC ........... H04N 5/23219; H04N 5/23293; H04N 5/232; H04N 5/2252; H04N 23/6811; H04N 23/617; H04N 23/61; H04N 23/651
See application file for complete search history.

(56) References Cited

U.S. PATENT DOCUMENTS

| | | | |
|---|---|---|---|
| 10,187,574 B1 | 1/2019 | Gigot | |
| 2013/0141597 A1 | 6/2013 | Lee et al. | |
| 2014/0355665 A1 | 12/2014 | Wegener | |
| 2015/0341535 A1* | 11/2015 | Forutanpour | H04N 23/611 348/222.1 |
| 2016/0092736 A1* | 3/2016 | Mai | G06V 40/10 382/103 |
| 2017/0134754 A1* | 5/2017 | Pan | H04N 19/23 |
| 2018/0191930 A1* | 7/2018 | Jeong | H04N 23/51 |
| 2018/0227502 A1 | 8/2018 | Menachem | |
| 2020/0304710 A1 | 9/2020 | Boyce et al. | |
| 2020/0351466 A1 | 11/2020 | Donsbach et al. | |
| 2022/0210363 A1* | 6/2022 | Ion | H04N 25/78 |

* cited by examiner

*Primary Examiner* — Xi Wang
(74) *Attorney, Agent, or Firm* — Polsinelli P.C.

(57) ABSTRACT

Techniques for power reduction of a camera system are disclosed. A camera system receives, via an image sensor, a video signal including a plurality of image frames, each frame including a plurality of pixels representing a plurality of objects. The camera system detects an object in an image frame and determines an amount of motion of the object by identifying and comparing the position of the object between each frame of the plurality of frames. The camera system identifies the object as belonging to a category of objects and generates a bounding box around the object. Based on the category and amount of motion, the camera system outputs a control signal to the image sensor to set a power level of the image sensor. The camera system encodes data representing the object in the bounding box at a compression level based on quality parameters associated with the category.

20 Claims, 5 Drawing Sheets

CONTEXTUALLY-AWARE POWER REDUCTION TECHNIQUES

TECHNICAL FIELD

The present disclosure pertains to power reduction techniques for camera systems and more specifically pertains to providing environmentally-responsive feedback to control power consumption of a camera.

BACKGROUND

Typically, security cameras run 24 hours, 7 days per week at coverage sites. Each coverage site may require many cameras to ensure that a user's needs are met, and many of these cameras may be battery operated, making power conservation critically important to the operating condition of the cameras. Yet for a large portion of camera uses and storage, there is limited to no movement activity warranting any image capture, image analysis by Artificial Intelligence (AI) technologies, processing of image streams, or storage of data. For example, although cameras focused on license plates at gas stations or parking lots provide some strong use cases for security cameras, motion may come in infrequent, short bursts, followed by periods of extended non-activity.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

In the figures, the left-most digit(s) of a reference number identifies the figure in which the reference number first appears. The use of the same reference numbers in different figures indicates similar or identical items or features. Moreover, multiple instances of the same part are designated by a common prefix, in some cases separated from the instance number by a dash and/or parentheses. The drawings are not necessarily to scale.

DETAILED DESCRIPTION

Figure 1:
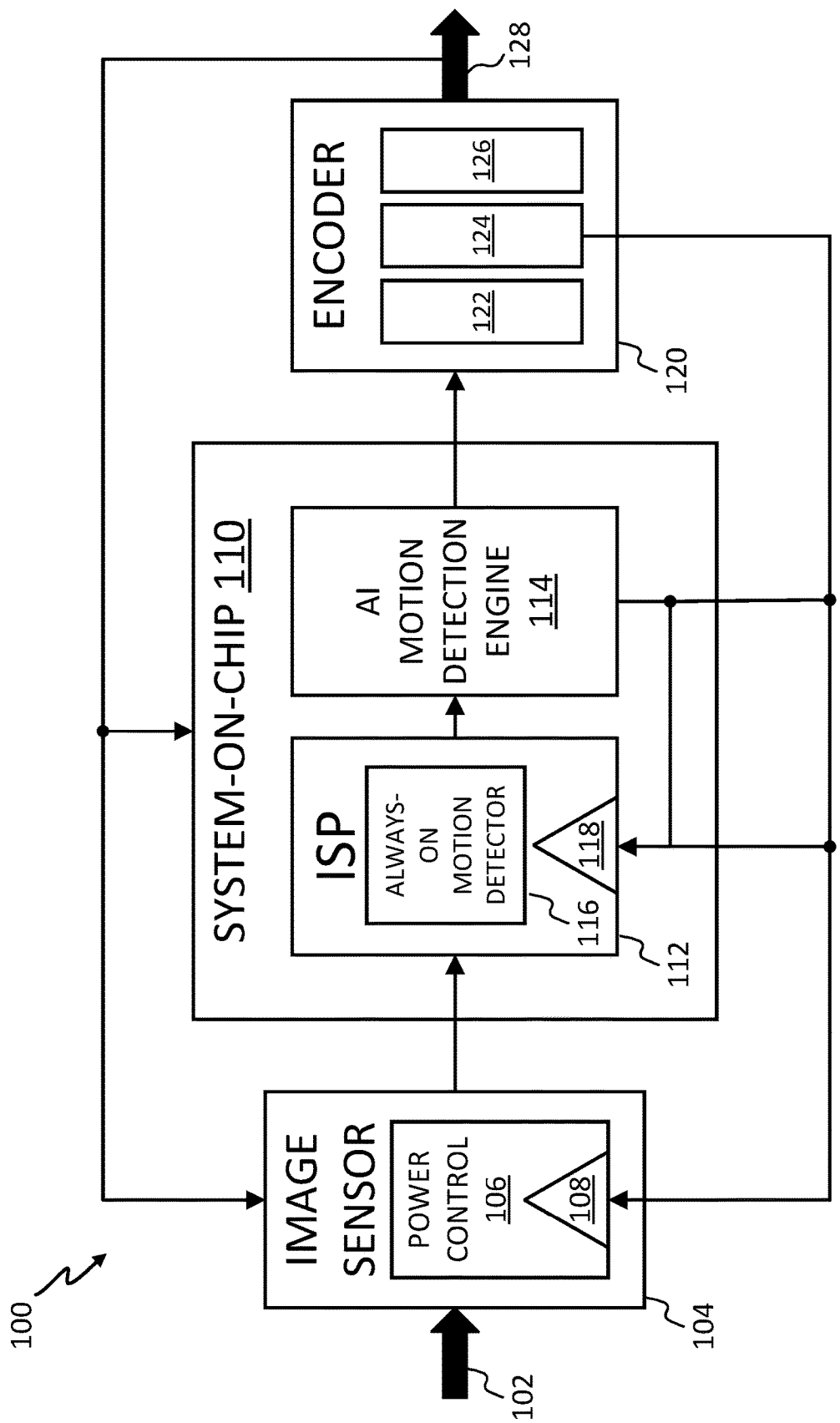
FIG. 1 illustrates a conceptual diagram of a camera system implementing contextually-aware power reduction techniques, in accordance with some examples of the present technology.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Overview

Disclosed are systems, apparatuses, methods, computer readable medium, and circuits for power reduction of a camera. According to at least one example, a method includes: receiving a video signal originating from an image sensor of the camera, the video signal comprising a plurality of image frames, each image frame comprising a plurality of pixels representing a plurality of objects; detecting an object of the plurality of objects in at least one image frame of the plurality of image frames; determining a threshold amount of motion of the object by identifying and comparing the position of the object between each frame of the plurality of frames; identifying the object as belonging to a category of pre-determined categories of objects based on characteristics of the object; generating a bounding box around the object belonging to the category and having the threshold amount of motion; outputting a control signal to the image sensor to set a power level of the image sensor, wherein a parameter of the control signal is based on the category; and encoding data representing the object in the bounding box at a compression level.

For example, an AI-driven encoder receives a video signal originating from an image sensor of the camera, the video signal comprising a plurality of image frames, each image frame comprising a plurality of pixels representing a plurality of objects; detects an object of the plurality of objects in at least one image frame of the plurality of image frames; determines a threshold amount of motion of the object by identifying and comparing the position of the object between each frame of the plurality of frames; identifies the object as belonging to a category of pre-determined categories of objects based on characteristics of the object; generates a bounding box around the object belonging to the category and having the threshold amount of motion; outputs a control signal to the image sensor to set a power level of the image sensor, wherein a parameter of the control signal is based on the category; and encodes data representing the object in the bounding box at a compression level.

In another example, a camera system for contextually-aware power reduction is provided that includes a storage (e.g., a memory configured to store data, such as virtual content data, one or more images, etc.) and one or more processors (e.g., implemented in circuitry) coupled to the memory and configured to execute instructions that, in conjunction with various components (e.g., a network interface, a display, an output device, etc.), cause the camera system to: receive a video signal originating from an image sensor of the camera, the video signal comprising a plurality of image frames, each image frame comprising a plurality of pixels representing a plurality of objects; detect an object of the plurality of objects in at least one image frame of the plurality of image frames; determine a threshold amount of motion of the object by identifying and comparing the position of the object between each frame of the plurality of frames; identify the object as belonging to a category of pre-determined categories of objects based on characteristics of the object; generate a bounding box around the object belonging to the category and having the threshold amount of motion; output a control signal to the image sensor to set a power level of the image sensor, wherein a parameter of the control signal is based on the category; and encode data representing the object in the bounding box at a compression level.

In yet another example, non-transitory computer-readable media for contextually-aware power reduction of a camera system are provided that include instructions, which, when executed by one or more processors, cause the camera system to: receive a video signal originating from an image sensor of a camera, the video signal comprising a plurality of image frames, each image frame comprising a plurality of pixels representing a plurality of objects; detect an object of the plurality of objects in at least one image frame of the plurality of image frames; determine a threshold amount of motion of the object by identifying and comparing the position of the object between each frame of the plurality of frames; identify the object as belonging to a category of pre-determined categories of objects based on characteristics of the object; generate a bounding box around the object belonging to the category and having the threshold amount of motion; output a control signal to the image sensor to set a power level of the image sensor, wherein a parameter of the control signal is based on the category; and encode data representing the object in the bounding box at a compression level.

Detailed Description of Example Embodiments

This disclosure describes contextually-aware power reduction techniques in camera systems. For example, the present solution can reduce the power consumption of a camera by reducing the camera's frame rates during periods of little or no motion or during periods when light conditions are poor (e.g., low levels of light).

The term "contextually-aware" relates to detecting aspects of the environment in video streams from a camera and further detecting and extracting certain information from those aspects regarding moving objects, such as people, vehicles, animals, moving trees, etc. The system prioritizes action that is happening in a scene that is worthy of capture. Based on the environmental data from the video streams, certain feedback can be provided to various components of the camera system. For example, the image sensor and/or image sensor pipeline of the camera can be adjusted to take in the scene in such a way that power consumed by the camera is reduced. Based on a presence or lack of identifiable objects of interest, a priority associated with those identifiable objects, and/or a historic rate of appearance of those identifiable objects, the system can determine what information should be kept versus discarded in the video streams. In general, the more information discarded, the more data processing efficiency can be achieved, and the more power consumption can be reduced. Various AI algorithms, based on different characteristics of what is detected in a scene, can be applied for each contextually-aware situation.

For example, when a stationary camera is recording a sidewalk, there may be very little movement worth recording. If ten people walk into the scene, further optimization can be done on the resulting video stream to detect specific things in the scene, e.g., where each person is within the scene, and to draw bounding boxes around each person. Once each bounding box is set, the system can then set a quality for each of the bounding boxes. For example, an algorithm can set the camera to record 10-bit image quality of a specific face in the scene, but 4-bit image quality for the environment around the face. A reduction in image quality of the scene around the face will result in less image data to process and thus less power consumption for processing. Thus, an image capture algorithm can treat certain aspects of objects (people, animals, vehicles, etc.) differently than other aspects of these objects, e.g., the algorithm can treat a person's face differently than a person's body and a vehicle differently than a license plate on the vehicle. Different objects can be treated differently than other objects. For example, the image quality of a person moving in the scene can be greater than the image quality of the person's pet that the person is walking.

The AI motion detection engine can detect that a possible object of interest exists due to the detection of changing pixels indicating motion and can determine the importance of the possible object of interest by first determining a category (i.e., classification) of that object of interest. Processing by the AI motion detection engine can indicate to an encoder where to apply higher quality to the image frames by providing to the encoder, along with a bounding box of an object, the category (i.e., the classification) of the object, a priority of the object, and/or a confidence of the data determination regarding the bounding box of the object.

Once an object is recognized and categorized by an AI algorithm, a bounding box is drawn, and priority based on the category and motion can be determined, along with a confidence value that the category is correct. The data can then be fed into the encoder implementing an encoding algorithm, e.g., H.264 Advanced Video Coding (AVC), H.265 High-Efficiency Video Coding (HEVC), or other similar coding algorithms contemplated by a person having ordinary skill in the art. The encoder itself has its own processing functionality to detect the bounding box and determine motion within the captured frames to determine additional processing of the data.

The encoder can then make decisions based on the motion, along with other information (such as priority and confidence associated with a category of object within the bounding box) from the AI motion detection engine, regarding how much quality should be applied to each bounding box to then determine how much compression is needed to prepare the data for transmission. This process can save power because, for lower quality requirements, the amount of data can be limited as to what is fed into the encoder and subsequently processed. The amount of data can also be limited by changing the pixel, or bit, depth. For example, 1920×1080p display resolution generates 2,073,600 pixels, where each pixel can produce 10 bits of data, for example, but the algorithm can decide how much of the data to keep and how much to discard (e.g., keep 6 bits and discard 4 bits), depending on how much detail that the algorithm determines is needed for the specific image captured.

Data and/or control signals from the encoder and/or AI motion detection engine can then be fed back into an image sensor device and/or an image sensor pipeline (ISP) device of the camera system to determine additional processing or control functions to save additional power. For example, the ISP can temporarily shut down specific areas of one of its processors that are not needed for data processing such that the processor can be held in a different state from a full bootup, the different state requiring a subset of processing and subsequently less power for the subset of processing. Additionally, or alternatively, if no motion has been detected over a certain amount of time (e.g., 30 frames), the system can reconfigure the image sensor to decrease power from 30 frames-per-second (30 FPS) mode to collect data at a lower frame rate, such as, for example, at 1 frame per second (1 FPS) mode, until more motion is detected by the AI motion detection engine or the encoder to then feed back to the image sensor and/or the ISP to direct the system to go back to 30 FPS mode.

Some camera systems can use blanking of an image sensor output to change the exposure time and thus the frame rate, which can lower power usage. However, the blanking effectively drops the frames that are blanked. For example, in 30-FPS mode, 29 frames can be dropped (blanked) of 30 frames. Alternatively, the image sensor of the present system can output 1 FPS using a control signal to the image sensor to put the image sensor to sleep (i.e., in a standby mode) during the other 29 frames. This method reduces power consumption further than the blanking approach and will maintain brightness level and is overall more efficient than blanking frames. See FIGS. 2A, 2B, and 2C, as discussed with regard to FIG. 1.

Thus, the camera system implements various power reduction actions in the various blocks of the system for aggregate power reduction of the camera system. In some embodiments, the various power reduction techniques described herein can be implemented independently of the other power reduction techniques. Each may be done separately and serially as data arrives at a block of the system. A power reduction action on the part of one block does not necessarily affect an action on the part of another block. In other words, no block has to communicate with another block for status of an applied power reduction action. Each block in the system can work independently based on the various feedback loops of the system. Although each block in the system can work independently, in some embodiments, coordination between one or more system blocks is desired and the system can be so configured.

The system trades off a small, but tolerable, increase in latency for significant power savings. Although some latency will be experienced in processing such feedback and/or changing processing state (e.g., during bootup of the ISP), the latency is tolerated during times of lesser motion detection. At most a few seconds of video might be lost during state changes or lesser quality may be experienced over a few seconds of greater motion, with negligible effect to the overall quality of the recording. Thus, purposefully setting the camera to a lower performance mode and accepting some latency for a significant power savings can be beneficial for certain cameras that operate in an always-on mode and/or over a 24-hour period.

Various aspects and examples of the disclosed system(s) and method(s) will now be described according to the figures.

FIG. 1 illustrates a conceptual diagram of a camera system 100 configured to implement the contextually-aware power reduction techniques described herein. In some examples, camera system 100 includes image sensor 104, system-on-chip (SoC) 110, and encoder 120. Image sensor 104 can include a power control 106 component having one or more control inputs including trigger input 108. SoC 110 can include image sensor pipeline (ISP) 112 and artificial intelligence (AI) motion detection engine 114. ISP 112 can include always-on motion detector 116 and one or more control inputs including trigger input 118. Encoder 120 can include control interface 122, motion detector 124, and frame generator 126.

Reflected light 102 can be received by the camera system's image sensor 104 that is sensitive to photons and wavelengths (corresponding to the color spectrum of the reflected light). Image sensor 104 can then convert the reflected light 102 into a digital signal representing a plurality of pixels that can be viewed, analyzed, and stored by camera system 100. Image sensor 104 can be specified in terms of structure type, chroma type, shutter type, resolution, frame rate, pixel size, and sensor format. Various details of image sensors, as understood by one of ordinary skill in the art, are beyond the scope of this application except as discussed herein.

The data signal representing the plurality of pixels can be sent from image sensor 104 to SoC 110 in a plurality of image frames, where the plurality of pixels represents a plurality of objects in the plurality of image frames. In some examples, the data signal representing the plurality of pixels can be sent from image sensor 104 to SoC 110 over a high-speed mobile industry processor (MIPI) interface. SoC 110, including ISP 112, can receive the plurality of image frames for processing, which may include filtering and image compensation, white balance, Bayer interpolation, color transformation, post-filtering, and display, compression, and storage functions, for example, as would be understood by a person having ordinary skill in the relevant art. The always-on motion detector 116 can detect motion on a frame-by-frame basis within the image frames and can cause the SoC 110 to perform additional processing based on the detected motion.

Processed image frames can be sent to AI motion detection engine 114 for detecting motion of specific object(s) of interest, generating bounding box(es) for those object(s), categorizing the object(s) into categories specified by one or more AI classification model(s), and further analyzing the objects to determine an importance, or priority level, of the detected object(s). Priority levels can be set manually or automatically. In some examples, priority levels can be preset and mapped to certain categories or classifications of objects. In other examples, priority levels can be set based on one or more AI model(s) trained using historical data. AI motion detection engine 114 can also determine a confidence of the categorization of the object(s) from the AI motion detection engine 114.

In some examples, AI motion detection engine 114 can output a control signal to other components of the camera system 100, for example, to a trigger input 108 on image sensor 104 and to a trigger input 118 on ISP 112, to trigger a power mode or other setting on the other components as motion detection changes. For example, AI motion detection engine 114 can send a control signal to image sensor 104 and/or ISP 112 to cause image sensor 104 and/or ISP 112 to be set from a full power mode to a low power mode when little or no motion has been detected over a certain amount of time. Conversely, AI motion detection engine 114 can send a control signal to image sensor 104 and/or ISP 112 to cause image sensor 104 and/or ISP 112 to be set from a low power mode to a full power mode when a threshold amount of motion by an object of interest is detected.

In some examples, information from the AI motion detection engine 114 is sent to encoder 120 and can include one or more bounding box(es) for detected object(s), a category classification of each detected object, a priority level indicating importance of the detected object, and a confidence determination. Encoder 120 can receive the information from AI motion detection engine 114 at control interface 122 and further process the information. In some examples, encoder 120 can map priority level from the AI motion detection engine 114 to a quality level. In some examples, processing by encoder 120 can include determining a quality of the data in the bounding box(es) based on predetermined quality parameters. In some examples, encoder 120 can make its own assessment of motion using motion detector 124 to make or further refine the quality determination.

In some examples, encoder 120 uses the quality determination to select a compression level for the video frames of each bounding box. Frame generator 126 then can apply the selected compression level to the video frames to result in encoded data 128. Encoded data 128 can then be sent to a storage or a display, and/or encoded data 128 can be fed back to SoC 110 for additional processing. The encoder can also output control parameters to feed contextual information, or control parameters based on contextual information, to the image sensor 104 and/or SoC 110 to configure operating parameters of the image sensor 104 and/or SoC 110. In some examples, camera system 100 can include additional control interfaces such as a multi-media framework (not shown).

The AI motion detection engine can be a stand-alone block in the system or part of the ISP 112, for example, as shown in FIG. 1 as AI motion detection engine 114. In the case that the AI motion detection engine performs as a stand-alone block, that is, as a separate processor outside of the SoC with AI models run directly through the separate processor, the output from the processor in the AI motion detection engine can be used to configure the rest of the system as needed. In this case, the AI motion detection engine could serve as a master of the system or driver of the configuration changes, where the rest of the system can base its configuration decisions on the AI output. This, however, can cause additional latency and could require more memory resources to capture the AI data and later process it.

Optionally, as would be understood by a person having ordinary skill in the relevant art, the system can implement various other peripherals as a means of collecting motion data to trigger data recording. For example, the system could use a Time of Flight (ToF) sensor to detect motion and to trigger any of the blocks of the system. A sensor fusion algorithm could be used to feed back to the image sensor and ISP to trigger the power reduction configurations. The system could use other types of sensors, such as thermal sensors, as well as event-based sensors (e.g., fast logarithmic sensors), which have a non-linear response to recognize key aspects of certain motion (e.g., detecting gestures and processing only a key part of the image for certain information, e.g., edges of fingers).

Advantageously, the control of the image sensor 104 at the trigger input 108 can quickly switch the image sensor 104 from one mode to another without any perceivable difference to the user. The image sensor bootup time can be very fast. For example, switching between wake up and sleep/standby can occur within a few milliseconds to a few hundred milliseconds, which is acceptable latency. It is noted that control of the image sensor 104 in this manner does not change the exposure as would occur if frames were blanked, as described earlier, where blanking can add a wait time after the first frame over the 29 blanked frames, which can cause perceivable flickering. While mode changes at a system level may have an intermittent session change, during which video can be lost, on-the-fly subsystem switching, such as implemented here for the image sensor 104, is more seamless.

Figure 2A:
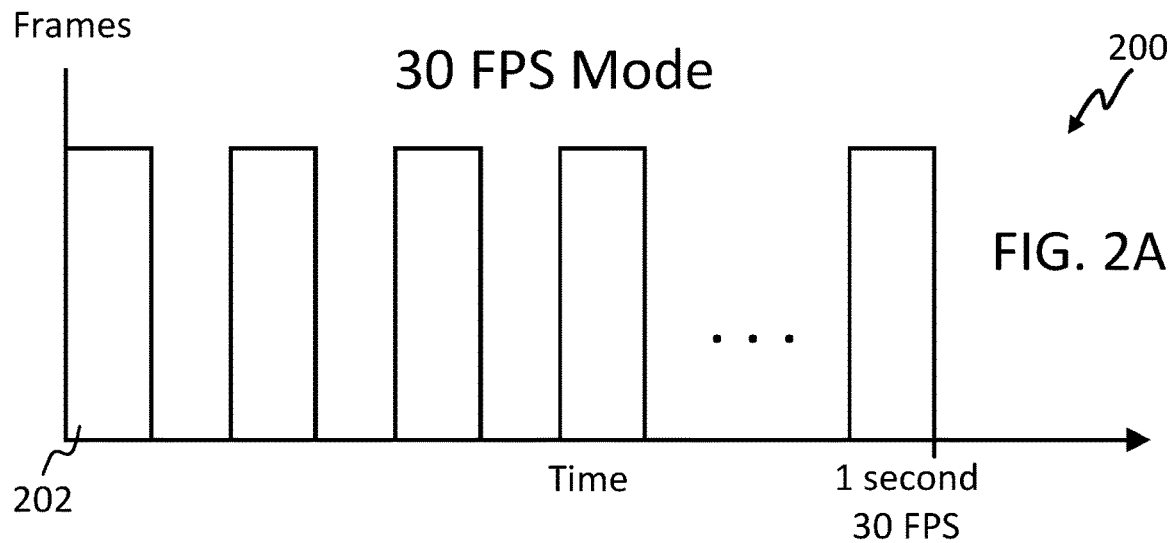
FIG. 2A illustrates a graph of a 30 frames-per-second (30 FPS) mode of a camera system, in accordance with some examples of the present technology.
Figure 2B:
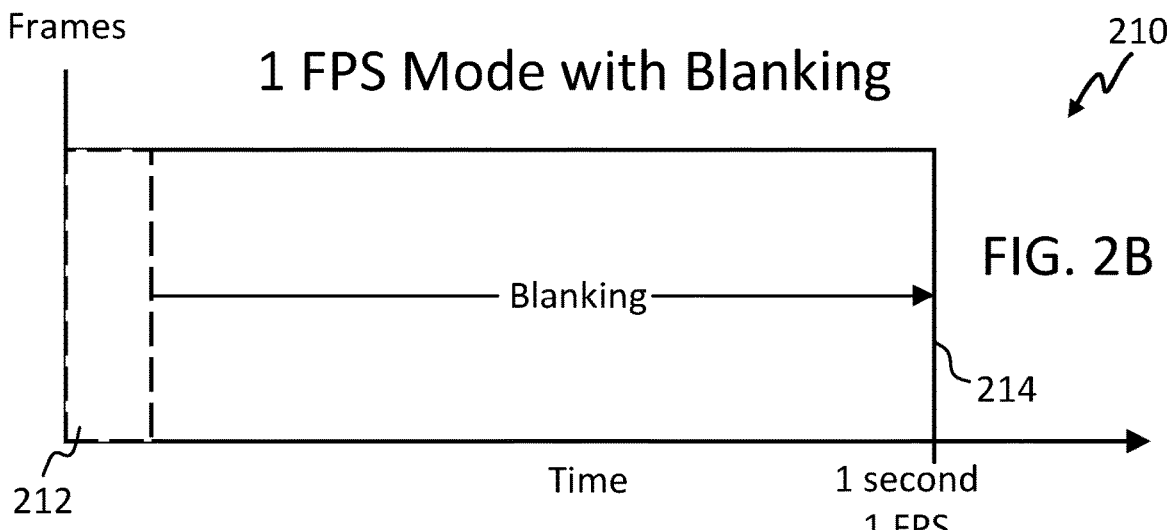
FIG. 2B illustrates a graph of a one frame-per-second (1 FPS) mode of a camera system, in accordance with some examples of the present technology.
Figure 2C:
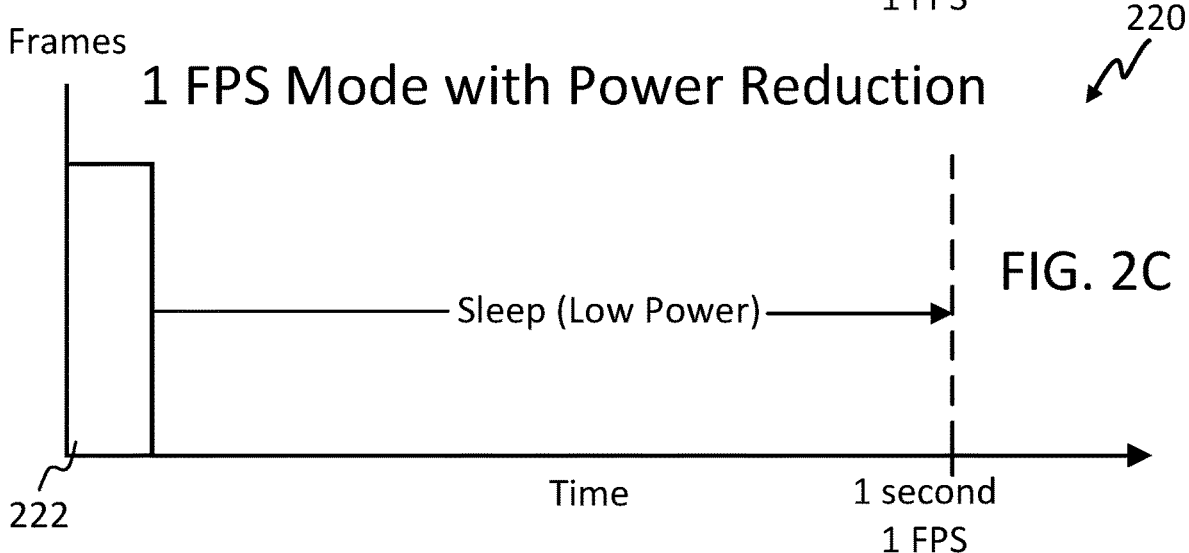
FIG. 2C illustrates a graph of a one frame-per-second (1 FPS) mode of a camera system, in accordance with some examples of the present technology.

For example, FIGS. 2A, 2B, and 2C illustrate example graphs of the frames-per-second modes of the system. FIG. 2A illustrates a graph 200 of the frames per one second from the image sensor (e.g., image sensor 104) when a camera system is operating in full-power 30 FPS mode. Frame 202 is output 30 times in one second. FIG. 2B illustrates a graph 210 of a frame per one second from the image sensor when a camera system blanks 29 frames to provide a low-power 1 FPS mode of operation. Frame 212 is extended over the one second of time to produce blanking signal 214, and the other 29 frames are dropped, which can cause perceivable flickering to the user. FIG. 2C illustrates a graph 220 when the present system puts the image sensor in 1 FPS mode by controlling the image sensor to sleep during the other 29 frames. Frame 222 is the only frame output over the one second of time, thus conserving power while preventing the perceivable flickering experienced with the method of FIG. 2B.

Figure 3:
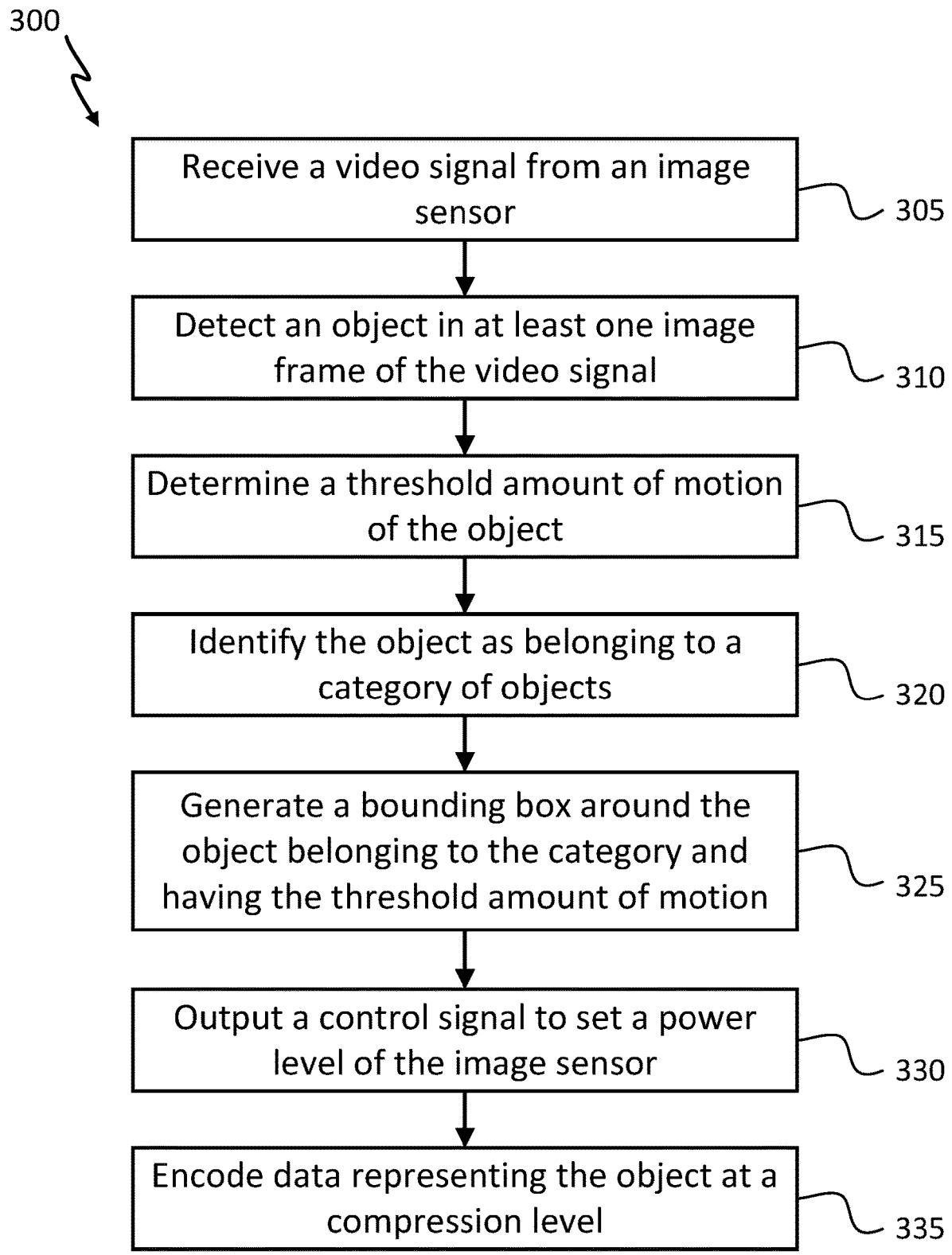
FIG. 3 is a flow diagram illustrating a process for reducing power consumption in a camera system using conceptually-aware power reduction techniques, in accordance with some examples of the present technology.

FIG. 3 is a flow diagram illustrating a method 300 for reducing power consumption in a camera system, such as the camera system 100 illustrated in FIG. 1, using conceptually-aware power reduction techniques. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method 300 includes receiving, at block 305, a video signal originating from an image sensor of a camera, for example, a camera in the camera system 100. For example, the SoC 110 illustrated in FIG. 1 may receive a video signal originating from an image sensor 104 of the camera. The video signal can include a plurality of image frames, each image frame including a plurality of pixels representing a plurality of objects. The plurality of objects can include physical objects. For example, the physical objects can include people, animals, and vehicles. The plurality of objects can also include features of the physical objects, such as facial features, body parts, and placards (such as a vehicle license plate). The plurality of objects can also include features in an environment, such as moving trees.

According to some examples, the method 300 includes detecting, at block 310, an object of the plurality of objects in at least one image frame of the plurality of image frames. For example, the AI motion detection engine 114 or the motion detector 124 of the encoder 120, illustrated in FIG. 1, may detect an object of the plurality of objects in at least one image frame of the plurality of image frames.

According to some examples, the method 300 includes determining, at block 315, a threshold amount of motion of the object by identifying and comparing the position of the object between each frame of the plurality of frames. For example, the AI motion detection engine 114 or the motion detector 124 of the encoder 120, illustrated in FIG. 1, may determine a threshold amount of motion of the object by identifying and comparing the position of the object between each frame of the plurality of frames.

According to some examples, the method 300 includes identifying, at block 320, the object as belonging to a category of pre-determined categories of objects based on characteristics of the object. For example, the AI motion detection engine 114 or the motion detector 124 of the encoder 120, illustrated in FIG. 1, may identify the object as belonging to a category of pre-determined categories of objects based on characteristics of the object. The characteristics of the object may comprise a size of the object, a shape of the object, a location of the object within each image frame, and a presence of a learned feature of the object, for example. In some embodiments, the category is correlated to a priority level for capturing images of the object belonging to the category.

For example, a priority 1 may be correlated to a category of people, especially facial features, or objects holding important information, such as license plates; a priority 2 may be correlated to a category of animals, such as wildlife or pets; a priority 3 may be correlated to a category of certain objects, such as motorized vehicles; a priority 4 may be correlated to other vehicles, such as bicycles; and a priority 5 may be correlated to moving objects of the environment, such as trees. In such examples, category 1 is the highest priority and category 5 is the lowest priority.

Objects and features of the objects may be learned for later detection by a machine learning (ML) engine executing one or more ML algorithms applying one or more ML models trained on similar objects and features of the objects. Such a ML engine can be part of camera system 100 or, preferably, can be separate from camera system 100. For example, trained ML models can run on, and/or be a part of, server(s) of a cloud computing system. The trained ML models can include, for instance, one or more neural networks (NNs), one or more convolutional neural networks (CNNs), one or more trained time delay neural networks (TDNNs), one or more deep networks, one or more auto-encoders, one or more deep belief nets (DBNs), one or more recurrent neural networks (RNNs), one or more generative adversarial networks (GANs), one or more trained support vector machines (SVMs), one or more trained random forests (RFs), one or more encoders, one or more decoders, one or more transformers, one or more deep learning systems, or combinations thereof.

The ML engine can train the ML models using historical data from object databases as training data. In some embodiments, the training data can include various examples of the objects discussed herein, such as people, including facial features, objects having important information, such as license plates, or other objects, such as animals or vehicles. The ML models can be trained using supervised learning, unsupervised learning, or a combination thereof. The ML models can additionally be trained using reinforcement learning. Object detection can be improved based on regular training cycles using updated historical data or based on feedback from humans using a reinforcement learning algorithm.

According to some examples, the method 300 includes generating, at block 325, a bounding box around the object belonging to the category and having the threshold amount of motion. For example, the AI motion detection engine 114 or the motion detector 124 of the encoder 120, illustrated in FIG. 1, may generate a bounding box around the object belonging to the category and having the threshold amount of motion. The threshold amount of motion may be pre-set by a user based on considerations of the specific environment(s) in which a camera system is installed. The threshold amount of motion may also be learned and periodically updated using the ML engine based on the learned motion characteristics of the categories of objects in certain environments in which a camera system is installed.

According to some examples, the method 300 includes outputting, at block 330, a control signal to the image sensor (e.g., the image sensor 104 of FIG. 1) to set a power level of the image sensor. For example, the AI motion detection engine 114 or the motion detector 124 of the encoder 120, illustrated in FIG. 1, may output a control signal to the image sensor 104 to set a power level of the image sensor 104. The control signal, which can be a trigger signal of one or more bits, for example, can cause the image sensor to output image frames at a frames-per-second (FPS) rate corresponding to a level of the control signal. The image sensor can receive the trigger signal at a trigger or strobe input (e.g., trigger input 108 of FIG. 1) of the image sensor's power controller (e.g., power control 106 of FIG. 1).

For example, if the AI motion detection engine 114 or the motion detector 124 of the encoder 120 detects little or no motion over a period of time, the trigger signal may be output as a low (0) signal to trigger input 108 to put the image sensor 104 into a low-power mode, for example, reducing the frames-per-second from a full-power state (e.g., 30 FPS) to a low-power state (e.g., 1 FPS). The trigger signal can thus put the image sensor 104 into a standby or sleep mode, using less power during the time in which the image sensor 104 is held in the standby or the sleep mode. When the AI motion detection engine 114 or the motion detector 124 of the encoder 120 detects the threshold level of motion of a detected object having a category of interest, the AI motion detection engine 114 or the motion detector 124 of the encoder 120 can output a high (1) signal to trigger input 108 to trigger the image sensor 104 to wake up and go back to a full-power (e.g., 30 FPS) state.

In some embodiments, the control signal can include additional bits to control additional modes of the image sensor of varying frames-per-second, such that the image sensor can go to standby during varying numbers of frames (e.g., output 5 frames per second and sleep for 25 frames per second, or output 10 frames per second and sleep for 20 frames per second, for an image sensor operating at 30 FPS in full-power mode). In any case, power consumption of the image sensor would be reduced during the times of standby/sleep.

The control signal can also cause the image sensor pipeline (ISP) device (e.g., ISP 112 of FIG. 1) to enter a low-power state in a similar manner, by sending the same trigger signal to a trigger (or strobe) input 118 of the ISP 112, for example. Thus, similar to the power control of the image sensor 104 described above, the control signal can be sent to ISP 112 to set a power level of the ISP 112. For example, upon receiving the control signal at trigger input 118 of ISP 112, the ISP 112 can enter a low-power state and power down at least one processing section of a processor of the ISP 112. It is noted that the ISP 112 includes at least one other processing section of its processor that is maintained in an awake (always-on) state to generate video stream segments comprising subsets of the plurality of pixels received from the image sensor. Thus, even if the system is in low power mode in times of little or no motion, the ISP 112 is ready to return to full-powered processing when sudden motion occurs in a video stream. For example, ISP 112 includes an always-on motion detector 116, which allows the ISP 112 to be ready for further image processing even if one or more processing sections of the ISP 112 are in low-power, standby mode. This increases availability of the system while still allowing for the system to utilize the power reduction techniques described herein.

Additionally, or alternatively, an algorithm executing on one or more processors of the camera system can be selected based on the category, movement, and/or priority (e.g., importance) of a detected object. The algorithm can define a parameter of the control signal to the ISP 112. The parameter of the control signal can define a reduced display resolution to be set at the ISP 112, for example, in times of little or no motion detection of objects of interest, or in times of detection of lesser priority objects. The reduced resolution can reduce a number of pixels in the plurality of pixels from a maximum number of pixels, where the maximum number of pixels is defined by the display resolution set by the image sensor 104. The reduced number of pixels from the ISP 112 will then require the encoder 120 to encode less data, therefore using less power.

Because the encoder 120 also has a role in detecting motion (by motion detector 124) within the captured frames, the encoder 120 can use this detection (or lack thereof) to further control the ISP 112 to limit its processing of image frames or perform additional processing of image frames. For example, in some embodiments, a bit depth (i.e., pixel depth) at the ISP 112 can be defined by the control signal from the encoder 120 into the ISP 112. The bit depth determines the range of values that a pixel can store, which is based on the formula $2^n$, wherein n is the bit depth. For example, for a bit depth of 8 bits, a pixel can store 2 8=255 values. Thus, decreasing the bit depth can limit the amount of data to be encoded. For example, for a 1920×1080p display resolution, the same number of pixels will be generated by the image sensor 104, where each pixel can produce 10 bits of data, for example, but the algorithm at the encoder 120 can decide how much of the data to keep and how much to discard for what is actually encoded (e.g., keep 6 bits and discard 4 bits), depending on how much detail that the algorithm determines is needed for the specific image captured. Thus, by decreasing the bit depth at the ISP 112, less data can be encoded, therefore using less power.

It is noted that although the control signal from the motion detector 124 of the encoder 120 or the AI motion detection engine 114 can be sent at the same time to the trigger inputs 108, 118 to control the power modes of the image sensor 104 and the ISP 112, respectively, the image sensor 104 and the ISP 112 can process data serially and independently of each other. The image sensor 104 and ISP 112 will process video signal/image frames, as received, in whatever power mode each is in at the time. Thus, overlapping video segments can be received by the encoder 120 to process data efficiently, with as little latency as possible.

According to some examples, the method 300 includes encoding, at block 335, data representing the object in the bounding box at a compression level. For example, the encoder 120, illustrated in FIG. 1, may encode data representing the object in the bounding box at a compression level. In some examples, the encoding is performed by an encoder (e.g., encoder 120) implementing H.264 Advanced Video Coding (AVC) or H.265 High-Efficiency Video Coding (HEVC).

According to some examples, the method 300 includes determining quality parameters associated with the priority level received from the AI motion detection engine 114 for a bounding box. For example, the encoder 120, illustrated in FIG. 1, may determine quality parameters associated with the priority level. The encoder 120 can thus assign a quality for the bounding box based on the priority level, where the priority level causes a plurality of features inside the bounding box of the object of interest to be encoded by encoder 120 at a corresponding quality based on the quality parameters. During the encoding, a different compression level can be assigned to each of other objects in other bounding boxes. Additionally, during the encoding, a default compression level can be assigned to each of other objects, outside of the bounding box of the object of interest, that are not bounded by another bounding box.

For example, where multiple bounding boxes are received by the encoder 120, encoder 120 can apply different levels of encoding to each of the bounding boxes. A default level of encoding can be applied outside of the bounding boxes. Each bounding box can then be assigned different levels of non-default encoding depending on each of a plurality of features inside the bounding boxes and the priority assigned to each of the plurality of features. For example, for priority 1 objects (e.g., moving people), a quality level for 10 bits, i.e., no loss of encoding, can produce maximum encoded data with the least compression at the encoder output. For priority 2 objects (e.g., moving animals, such as pets), less quality (e.g., 8 bits) can be applied for some loss of encoding, which will produce less encoded data and a corresponding amount of additional compression. Similarly, for priority 3 objects, a non-default level of encoding (e.g., 6 bits) can be applied with associated loss of encoding and more compression, and so on.

According to some examples, the method 300 includes, after encoding the data, preparing the data for transmission. For example, the encoder 120 illustrated in FIG. 1 may prepare the data for transmission. According to some examples, the method 300 further includes transmitting the data for additional processing. For example, the encoder 120 illustrated in FIG. 1 may transmit the data for additional processing. According to some examples, the method 300 further includes transmitting the data to a storage device. For example, the encoder 120 illustrated in FIG. 1, or another post-processing component, may transmit the data to a storage device.

In some embodiments, encoder 120 may transmit the data back to the ISP 112 for additional processing by ISP 112. For example, ISP 112 can perform additional processing to change several aspects of video quality in exchange for power savings. Such examples of additional ISP processing include changing chroma subsampling to reduce bit depth, scaling an image to reduce scaling quality, cropping an image, or turning off certain correction blocks in ISP 112. Additionally, ISP 112 can reduce power by performing line interlacing, i.e., refreshing every second line of an image frame and alternating line sets for the next frame.

Figure 4:
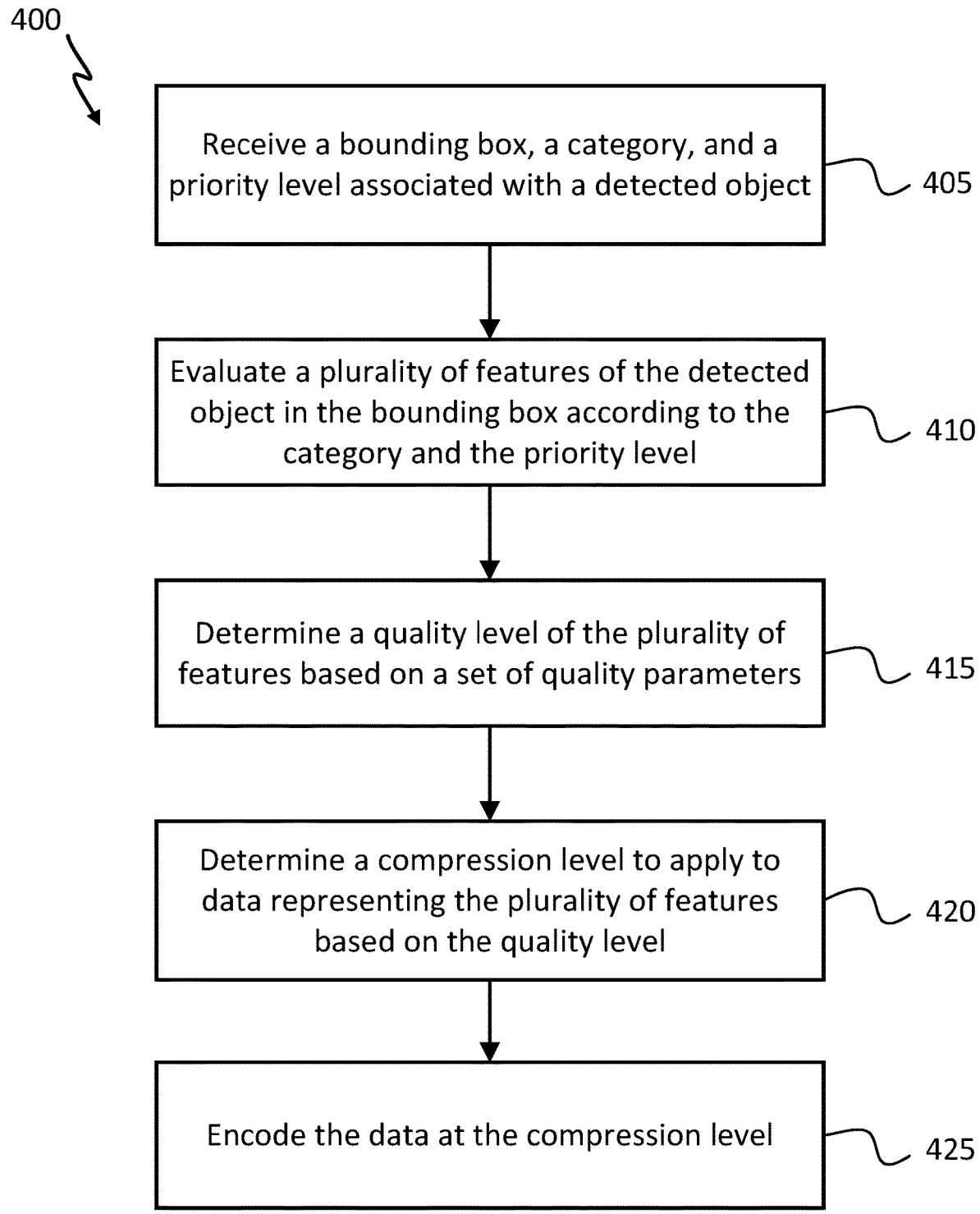
FIG. 4 is a flow diagram illustrating a process for encoding image data from a camera system implementing conceptually-aware power reduction techniques, in accordance with some examples of the present technology.

FIG. 4 is a flow diagram illustrating a method 400 for encoding image data from a camera system implementing conceptually-aware power reduction techniques. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method 400 includes receiving, at block 405, a bounding box, a category, and a priority level associated with a detected object. For example, the encoder 120 illustrated in FIG. 1 may receive a bounding box, a category of an object represented by the bounding box, and a priority level (or importance) of the object represented by the bounding box from AI motion detection engine 114.

According to some examples, the method 400 includes evaluating, at block 410, a plurality of features of the detected object in the bounding box according to the category and the priority level. For example, the encoder 120 illustrated in FIG. 1 may evaluate a plurality of features of the detected object in the bounding box according to the category and the priority level received from AI motion detection engine 114.

According to some examples, the method 400 includes determining, at block 415, a quality level of the plurality of features based on a set of quality parameters. For example, the encoder 120 illustrated in FIG. 1 may determine a quality level of the plurality of features based on a set of quality parameters that are pre-determined for each category of object and associated with preset compression levels, or bitrates, in encoder 120. According to some examples, the method 400 includes determining, at block 420, a compression level to apply to data representing the plurality of features of the detected object in the bounding box, where the compression level is based on the determined quality level. For example, the encoder 120 illustrated in FIG. 1 may determine a compression level in terms of bitrate to apply to data representing the plurality of features, where the compression level is selected according to the quality level and refined based on the quality parameters.

In one embodiment, selectable video bitrates in kilobits per second (kbits/s) may be 500, 1000, 2000, 4000, 6000, and 8000, where 500 kbits/s takes the least time to encode and requires the least compression (for the least quality bitrate), and 8000 kbits/s takes the most time to encode and requires the most compression (for the highest quality bitrate). Each of these bitrates may be further defined by the set of quality parameters. For example, the set of quality parameters may be as defined for an H.264 encoder: "ultrafast," "superfast," "veryfast," "faster," "fast," "medium," "slow," "slower," and "veryslow," where "ultrafast" takes the least time to encode and requires the least compression (thus, the least quality), and "veryslow" requires the most time to encode and requires the most compression (thus, the highest quality).

For example, a person's facial features may require the highest quality encoding and a vehicle's license plate may require the next highest quality encoding. Thus, when the AI motion detection engine 114 categorizes the object as a person (or a person's face) at the highest priority, the encoder 120 may select an 8000 kbits/s bitrate adjusted by a "veryslow" quality parameter. As another example, when the AI motion detection engine 114 categorizes an object as a moving vehicle at the highest priority (to capture a license plate, for example), the encoder 120 may select a 6000 kbits/s bitrate adjusted by a "veryslow" quality parameter. Thus, the person's facial features would be recorded at an overall quality and compression level slightly higher than for the vehicle's license plate.

According to some examples, the method 400 includes encoding, at block 425, the data at the determined compression level to result in encoded data. For example, the encoder 120 illustrated in FIG. 1 may encode the data at the determined compression level to result in encoded data 128 at the output of the encoder 120.

Figure 5:
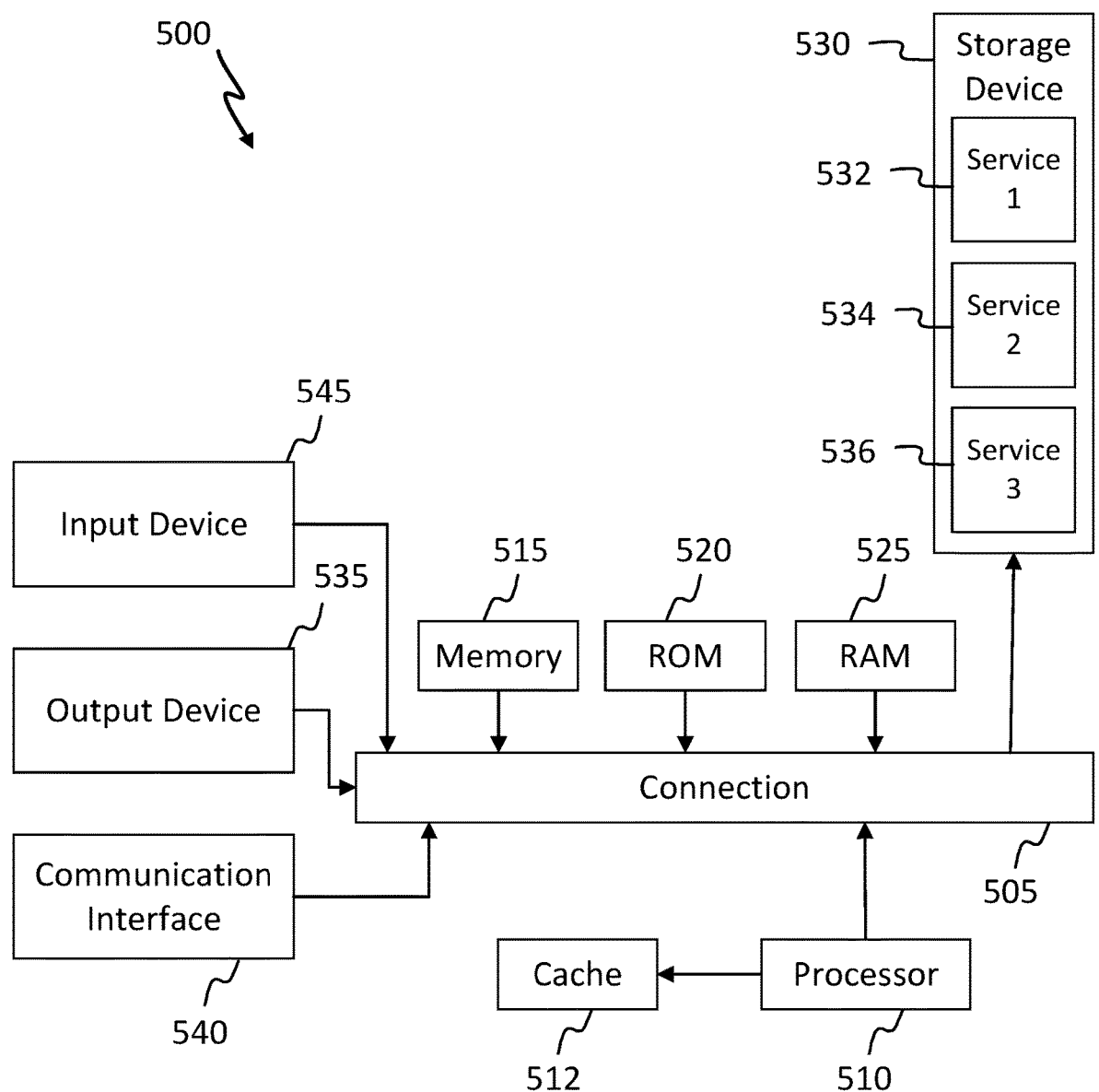
FIG. 5 shows an example of a computing system, which can be, for example, any computing device that can implement components of the system described herein.

FIG. 5 is a block diagram illustrating a computing system 500 for performing techniques described herein. Computing system 500 can be, for example, any computing device for implementing aspects of the system 100 for conceptually-aware power reduction, or any component thereof in which the components of the computing system 500 are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc., and alternatively, or additionally, by aspects of a cloud computing system. In some embodiments, one or more of the described system components of computing system 500 can represent many such components, each performing some or all of the functions for which the component is described. In some embodiments, the components of computing system 500 can be physical or virtual devices.

Example computing system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510, as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

For example, processor 510 can be implemented as one or more microprocessors, microcomputers, microcontrollers, digital signal processors, central processing units, state machines, logic circuitries, and/or any devices that manipulate signals based on operational instructions. In some examples, processor 510 can be one or more hardware processors and/or logic circuits of any suitable type specifically programmed or configured to execute the algorithms and processes described herein. The processor 510 can be configured to fetch and execute computer-readable processor-executable instructions stored in computer-readable media.

Storage device 530 can be a non-volatile memory device and can be a hard disk or other types of computer-readable media that can store data that are accessible by a computer, such as magnetic cassettes, flash memory cards, solid state memory devices, digital versatile disks, cartridges, random-access memories (RAMs), read-only memory (ROM), and/or some combination of these devices.

The storage device 530 can include software services, servers, services, etc., such that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

Computer-readable media can be used to store and maintain any number of functional components that are executable by processor 510. In some implementations, these functional components comprise instructions or programs that are executable by the processor 510 and that, when executed, implement operational logic for performing the actions and services attributed above to computing system 500 implementing, for example, system 100.

Computer-readable media can also optionally include other functional components and data, which can include programs, drivers, etc., and the data used or generated by the functional components, such as any elements described herein as used by the system 100 and the computing system 500. In addition, the computer-readable media can also store data, data structures and the like, which are used by the functional components. The computer-readable media can include additional functional components, such as an operating system for controlling and managing various functions of and enabling user interactions with system 100 and for controlling and managing various functions of servers 504 and cloud servers 522, for example.

Computing system 500 can include communication interface 540, which can govern and manage user input and system output. The communication interface 540 can include one or more interfaces and hardware components for enabling communication with various other devices, such as over one or more networks. The one or more networks can include, but are not limited to, any type of network known in the art, such as a local area network or a wide area network (such as the Internet), and can include a wireless network (such as a cellular network), a cloud network (such as a cloud computing system), a local wireless network (such as Wi-Fi and/or close-range wireless communications, such as Bluetooth®, BLE, NFC, RFID), a wired network, or any other such network, or any combination thereof. Accordingly, networks can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

To enable user interaction, computing system 500 can include an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500.

There is no restriction on operating on any particular hardware arrangement, and therefore the basic features here may easily be substituted for improved hardware or firmware arrangements as they are developed. In some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable media expressly exclude media such as energy, carrier signals, electromagnetic waves, and signals per se.

Methods according to the examples described herein (e.g., methods 300 and 400) can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Although a variety of examples and other information were used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Example aspects of the disclosure include:

Aspect 1. A method for power reduction of a camera, the method comprising: receiving a video signal originating from an image sensor of the camera, the video signal comprising a plurality of image frames, each image frame comprising a plurality of pixels representing a plurality of objects; detecting an object of the plurality of objects in at least one image frame of the plurality of image frames; determining a threshold amount of motion of the object by identifying and comparing the position of the object between each frame of the plurality of frames; identifying the object as belonging to a category of pre-determined categories of objects based on characteristics of the object; generating a bounding box around the object belonging to the category and having the threshold amount of motion; outputting a control signal to the image sensor to set a power level of the image sensor, wherein a parameter of the control signal is based on the category; and encoding data representing the object in the bounding box at a compression level.

Aspect 2. The method of Aspect 1, wherein the characteristics of the object comprise a size of the object, a shape of the object, a location of the object within each image frame, and a presence of a learned feature of the object.

Aspect 3. The method of any of Aspects 1 to 2, wherein the plurality of objects comprises physical objects, features of the physical objects, or features in an environment, wherein the physical objects include people, animals, and vehicles.

Aspect 4. The method of any of Aspects 1 to 3, wherein the control signal causes the image sensor to output image frames at a frames-per-second (FPS) rate corresponding to a level of the control signal.

Aspect 5. The method of any of Aspects 1 to 4, wherein the category is correlated to a priority level for capturing images of the object belonging to the category.

Aspect 6. The method of any of Aspects 1 to 5, wherein the encoding is performed by an encoder implementing H.264 Advanced Video Coding (AVC) or H.265 High-Efficiency Video Coding (HEVC).

Aspect 7. The method of any of Aspects 1 to 6, wherein the encoder assigns a quality for the bounding box based on a priority level.

Aspect 8. The method of any of Aspects 1 to 7, further comprising determining quality parameters associated with the priority level.

Aspect 9. The method of any of Aspects 1 to 8, wherein the priority level causes a plurality of features inside the bounding box to be encoded at a corresponding quality based on the quality parameters.

Aspect 10. The method of any of Aspects 1 to 9, further comprising, after encoding the data, preparing the data for transmission.

Aspect 11. The method of any of Aspects 1 to 10, further comprising, after preparing the data for transmission, transmitting the data to a storage device.

Aspect 12. The method of any of Aspects 1 to 11, further comprising, after preparing the data for transmission, transmitting the data for additional processing.

Aspect 13. The method of any of Aspects 1 to 12, further comprising outputting, based on an algorithm, the control signal to an image sensor pipeline device to set a power level of the image sensor pipeline device.

Aspect 14. The method of any of Aspects 1 to 13, wherein the image sensor and the image sensor pipeline device process data serially and independently from each other.

Aspect 15. The method of any of Aspects 1 to 14, wherein the control signal causes the image sensor pipeline device to enter a low-power state, wherein, while in the low-power state, the image sensor pipeline device powers down at least one processing section of a processor of the image sensor pipeline device.

Aspect 16. The method of any of Aspects 1 to 15, wherein the image sensor pipeline device comprises at least one other processing section of the processor that is maintained in an awake state to generate video stream segments comprising subsets of the plurality of pixels received from the image sensor.

Aspect 17. The method of any of Aspects 1 to 16, wherein: a maximum number of pixels is defined by a display resolution set by the image sensor; and a reduced resolution is defined by the control signal, wherein the reduced resolution reduces a number of pixels in the plurality of pixels from the maximum number of pixels.

Aspect 18. The method of any of Aspects 1 to 17, wherein a bit depth is defined by the control signal.

Aspect 19. The method of any of Aspects 1 to 18, wherein, during the encoding, a different compression level is assigned to each of other objects in other bounding boxes.

Aspect 20. The method of any of Aspects 1 to 19, wherein, during the encoding, a default compression level is assigned to each of other objects, outside of the bounding box, that are not bounded by another bounding box.

Aspect 21. A method for contextually-aware power reduction of a camera, the method comprising: receiving a video signal originating from an image sensor of the camera, the video signal comprising a plurality of image frames, each image frame comprising a plurality of pixels representing a plurality of objects; detecting an object of the plurality of objects in at least one image frame of the plurality of image frames; determining a threshold amount of motion of the object by identifying and comparing the position of the object between each frame of the plurality of frames; identifying the object as belonging to a category of pre-determined categories of objects based on characteristics of the object; generating a bounding box around the object determined to have the threshold amount of motion; assigning a priority level for the bounding box based on the category and an amount of motion exceeding the threshold amount of motion; from a plurality of algorithms, based on the category; outputting, based on the algorithm, a trigger signal to the image sensor to set a power level of the image sensor; and encoding, based on the algorithm, data representing the object in the bounding box at a compression level associated with the priority level.

Aspect 22. The method of Aspect 21, wherein the characteristics of the object comprise a size of the object, a shape of the object, a location of the object within each image frame, and a presence of a learned feature of the object.

Aspect 23. The method of any of Aspects 21 to 22, wherein the plurality of objects comprises physical objects, features of the physical objects, or features in an environment, wherein the physical objects include people, animals, and vehicles.

Aspect 24. The method of any of Aspects 21 to 23, wherein detecting the object comprises distinguishing the object from other objects of the plurality of objects.

Aspect 25. The method of any of Aspects 21 to 24, wherein the trigger signal causes the image sensor to be set at a frames-per-second (FPS) rate corresponding to a level of the trigger signal.

Aspect 26. The method of any of Aspects 21 to 25, wherein the encoding is performed by an encoder implementing H.264 Advanced Video Coding (AVC) or H.265 High-Efficiency Video Coding (HEVC).

Aspect 27. The method of any of Aspects 21 to 26, wherein the encoder assigns a quality level for the bounding box based on the priority level.

Aspect 28. The method of any of Aspects 21 to 27, further comprising, after encoding the data, preparing the data for transmission.

Aspect 29. The method of any of Aspects 21 to 28, further comprising, after preparing the data for transmission, transmitting the data to a storage device.

Aspect 30. The method of any of Aspects 21 to 29, further comprising, after preparing the data for transmission, transmitting the data to the image sensor for additional processing.

Aspect 31. The method of any of Aspects 21 to 30, further comprising, after preparing the data for transmission, transmitting the data to an image sensor pipeline device for additional processing.

Aspect 32. The method of any of Aspects 21 to 31, wherein the image sensor and the image sensor pipeline device process data serially and independently of each other.

Aspect 33. The method of any of Aspects 21 to 32, further comprising outputting, based on the algorithm, the trigger signal to an image sensor pipeline device to set a power level of the image sensor pipeline device.

Aspect 34. The method of any of Aspects 21 to 33, wherein the control signal causes the image sensor pipeline device to enter a low-power state, wherein, while in the lower-power state, the image sensor pipeline device powers down at least one processing section of a processor of the image sensor pipeline device.

Aspect 35. The method of any of Aspects 21 to 34, wherein the image sensor pipeline device comprises at least one other processing section of the processor that is maintained in an awake state to generate video stream segments comprising subsets of the plurality of pixels received from the image sensor.

Aspect 36. The method of any of Aspects 21 to 35, further comprising determining quality parameters associated with the priority level.

Aspect 37. The method of any of Aspects 21 to 36, wherein: the priority level causes a plurality of features inside the bounding box to be encoded at a quality level based on the quality parameters, a subset of the quality parameters is applied to the plurality of features, based on the category, to determine the quality level, and the quality level is proportional to the compression level applied to a subset of the plurality of pixels representing the plurality of features.

Aspect 38. The method of any of Aspects 21 to 37, wherein the category is associated with learned features of the plurality of features.

Aspect 39. The method of any of Aspects 21 to 38, wherein: a maximum number of pixels is defined by a display resolution set by the image sensor; and a pixel depth is determined, based on the algorithm, by reducing a number of pixels in the plurality of pixels from the maximum number of pixels.

Aspect 40. The method of any of Aspects 21 to 39, wherein, during the encoding, a different compression level is assigned to each of other objects in other bounding boxes.

Aspect 41. The method of any of Aspects 21 to 40, wherein, during the encoding, a default compression level is assigned to each of other objects, outside of the bounding box, that are not bounded by another bounding box.

Aspect 42. The method of any of Aspects 21 to 41, wherein the trigger signal is transmitted to a trigger input of the image sensor or image sensor pipeline device.

Aspect 43. The method of any of Aspects 21 to 42, wherein a detection algorithm tracks a frequency of detection of an object having a defined category and determines a frame rate based on the frequency of detection.

Aspect 44. The method of any of Aspects 21 to 43, wherein the encoding comprises: evaluating the data representing the object in the bounding box, according to the category; and setting the compression level according to the data and a quality level associated with the priority level.

What is claimed is:

1. A method for power reduction of a camera, the method comprising:
receiving a video signal originating from an image sensor of the camera, the video signal comprising a plurality of image frames, each image frame comprising a plurality of pixels representing a plurality of objects;
detecting an object of the plurality of objects in at least one image frame of the plurality of image frames;
determining that the object has moved greater than a threshold amount;
identifying the object as belonging to a category of pre-determined categories of objects based on characteristics of the object;
outputting a control signal to the image sensor to set a power level of the image sensor, wherein a parameter of the control signal is based on the category;
generating a bounding box around the object belonging to the category wherein an encoder assigns a quality for the bounding box based on a priority level; and
encoding data within the bounding box around the object at a compression level correlated to the assigned quality.

2. The method of claim 1, wherein the control signal causes the image sensor to output the plurality of image frames at a frames-per-second (FPS) rate corresponding to a level of the control signal.

3. The method of claim 1, wherein the category is correlated to the priority level for capturing images of the object belonging to the category.

4. The method of claim 1, further comprising determining quality parameters associated with the priority level.

5. The method of claim 1, further comprising outputting, based on an algorithm, the control signal to an image sensor pipeline device to set a power level of the image sensor pipeline device.

6. The method of claim 5, wherein the control signal causes the image sensor pipeline device to enter a low-power state, wherein, while in the low-power state, the image sensor pipeline device powers down at least one processing section of a processor of the image sensor pipeline device.

7. The method of claim 1, wherein, during the encoding, a different compression level is assigned to each of other objects in a corresponding bounding box different from the bounding box of the object.

8. The method of claim 1, wherein, during the encoding, a default compression level is assigned to each of other objects, outside of the bounding box of the object, that are not bounded by another bounding box.

9. A system comprising:
one or more processors; and
memory comprising instructions, that, when executed by the one or more processors, cause the system to:
receive a video signal originating from an image sensor of a camera, the video signal comprising a plurality of image frames, each image frame comprising a plurality of pixels representing a plurality of objects;
detect an object of the plurality of objects in at least one image frame of the plurality of image frames;
determine that the object has moved greater than a threshold amount;
identify the object as belonging to a category of predetermined categories of objects based on characteristics of the object;
output a control signal to the image sensor to set a power level of the image sensor, wherein a parameter of the control signal is based on the category;
generate a bounding box around the object belonging to the category wherein an encoder assigns a quality for the bounding box based on a priority level; and
encode data within the bounding box around the object at a compression level correlated to the assigned quality.

10. The system of claim 9, wherein the control signal causes the image sensor to output the plurality of image frames at a frames-per-second (FPS) rate corresponding to a level of the control signal.

11. The system of claim 9, wherein the category is correlated to the priority level for capturing images of the object belonging to the category.

12. The system of claim 9, wherein the instructions, when executed by the one or more processors, further cause the system to determine quality parameters associated with the priority level.

13. The system of claim 9, wherein the instructions, when executed by the one or more processors, further cause the system to output, based on an algorithm, the control signal to an image sensor pipeline device to set a power level of the image sensor pipeline device.

14. The system of claim 13, wherein the control signal causes the image sensor pipeline device to enter a low-power state, wherein, while in the low-power state, the image sensor pipeline device powers down at least one processing section of the image sensor pipeline device.

15. The system of claim 9, wherein, to encode the data, a different compression level is assigned to each of other objects in a corresponding bounding box different from the bounding box of the object.

16. A non-transitory computer-readable storage medium comprising instructions stored thereon, wherein the instructions, when executed by one or more processors of a camera system, cause the camera system to:
receive a video signal originating from an image sensor of a camera, the video signal comprising a plurality of image frames, each image frame comprising a plurality of pixels representing a plurality of objects;
detect an object of the plurality of objects in at least one image frame of the plurality of image frames;
determine that the object has moved greater than a threshold amount;
identify the object as belonging to a category of predetermined categories of objects based on characteristics of the object;
output a control signal to the image sensor to set a power level of the image sensor, wherein a parameter of the control signal is based on the category;
generate a bounding box around the object belonging to the category wherein an encoder assigns a quality for the bounding box based on a priority level; and
encode data within the bounding box around the object at a compression level correlated to the assigned quality.

17. The non-transitory computer-readable storage medium of claim 16, wherein the control signal causes the image sensor to output the plurality of image frames at a frames-per-second (FPS) rate corresponding to a level of the control signal.

18. The non-transitory computer-readable storage medium of claim 16, wherein the instructions, when executed by the one or more processors of the camera system, further cause the camera system to determine quality parameters associated with the priority level.

19. The non-transitory computer-readable storage medium of claim 16, wherein the instructions, when executed by the one or more processors of the camera system, further cause the camera system to output, based on an algorithm, the control signal to an image sensor pipeline device to set a power level of the image sensor pipeline device.

20. The non-transitory computer-readable storage medium of claim 16, wherein, to encode the data, a default compression level is assigned to each of other objects, outside of the bounding box of the object, that are not bounded by another bounding box.

* * * * *